Sept. 29, 1970     A. CHAREST     3,530,741
MECHANICAL DRIVING AND STEERING SYSTEM FOR TRACKED VEHICLES
Filed Dec. 18, 1968
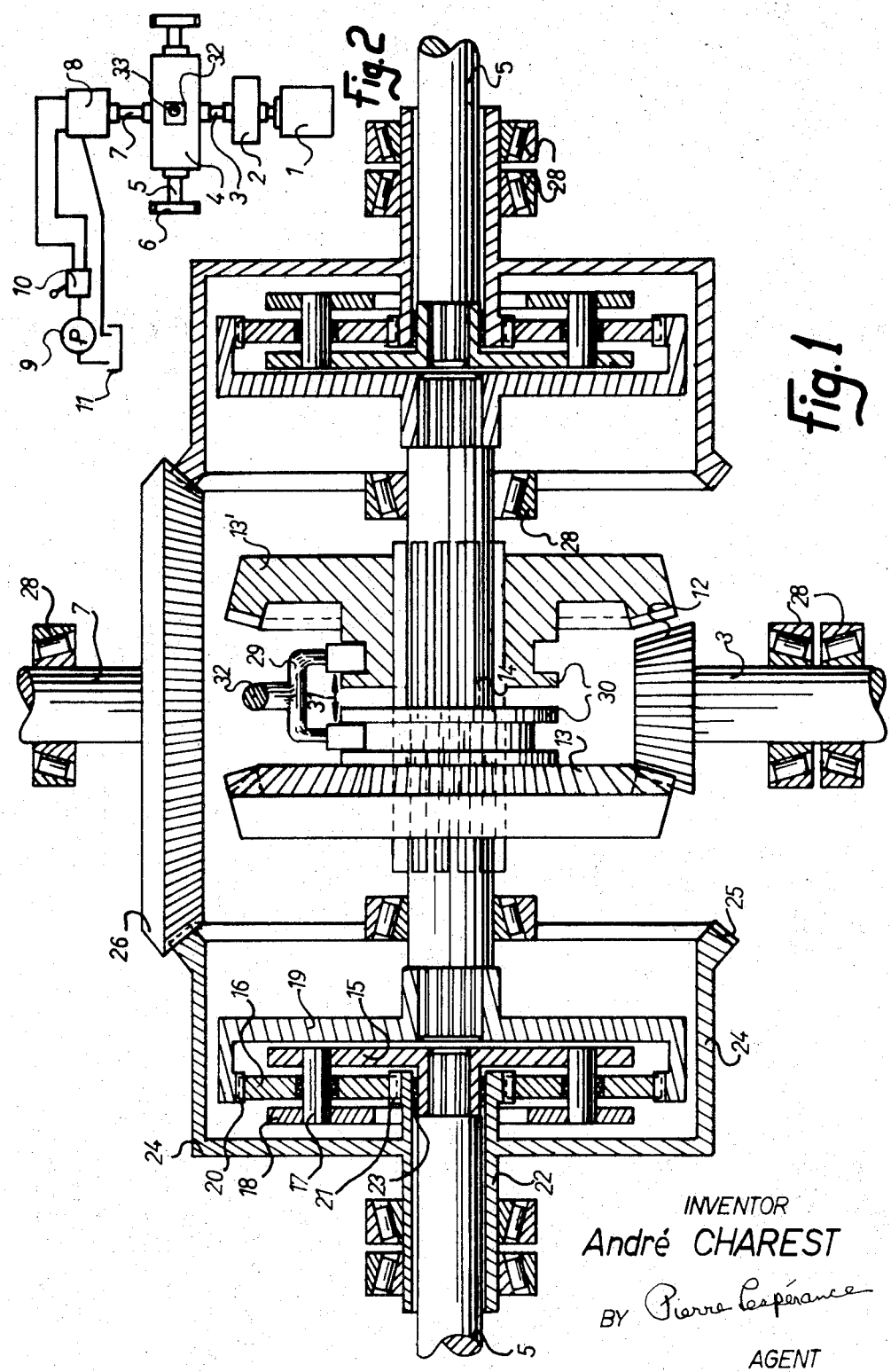
INVENTOR
André CHAREST
BY Pierre Lespérance
AGENT United States Patent Office 3,530,741
Patented Sept. 29, 1970

3,530,741
MECHANICAL DRIVING AND STEERING SYSTEM FOR TRACKED VEHICLES
André Charest, 160 Des Bouleaux St.,
Lyster, Quebec, Canada
Filed Dec. 18, 1968, Ser. No. 784,611
Int. Cl. F16h *37/08, 37/06*
U.S. Cl. 74—675         10 Claims

ABSTRACT OF THE DISCLOSURE

A mechanical driving and steering system for tracked vehicles having at least two tracks, comprising output shafts for driving the respective tracks, a power-driven shaft connected to the respective output shafts through the intermediary of planetary gear systems, each having a reaction gearing, and a steering shaft producing rotation of the reaction gearings in opposite directions, so as to cause rotation of the respective output shafts at different speeds for steering of the vehicle with a minimum loss of power.

---

The present invention relates to a mechanical driving and steering system for tracked vehicles, more particularly of tracked vehicles having at least two tracks.

The conventional manner of steering a two-track vehicle is to declutch and brake the inside track during a turn. This steering method results in a substantial loss of energy.

It is the general object of the present invention to provide a steering system for tracked vehicles, combined with a drive therefor, which obviates the above-noted disadvantage in that steering can be effected with a minimum loss of energy.

It is another object of the present invention to provide steering of a two-track vehicle while causing the driving wheels of the tracks to be driven at a variable controlled speed ratio, resulting in a smoother turning movement of the vehicle.

Another object of the present invention resides in the provision of a driving and steering assembly of the character described, which is of very simple and inexpensive construction and which may include a reverse drive.

Another object of the present invention resides in the provision of a steering and driving assembly of the character described, which can be used in tracked vehicles of different types, such as tanks, snowmobiles, tractors, power shovels and the like vehicles having at least two tracks.

The foregoing and other objects of the present invention will become more apparent during the following disclosure and by referring to the drawings, in which:

FIG. 1 is a section of the driving and steering system of the invention; and

FIG. 2 is a schematic assembly of the system of the invention and of related parts of the vehicle.

In the drawings, like reference characters indicate like elements throughout.

Referring to FIG. 2, an engine 1 of the track vehicle drives a multi-speed transmission unit 2, which includes a clutch and also, preferably, a brake. The unit 2 is of conventional construction. The output of the unit 2 is connected to a shaft 3 of the system in accordance with the invention, said system being enclosed in a housing 4. Thus, shaft 3 constitutes a power-driven input shaft for the mechanical drive and steering system of the invention.

A pair of output shafts 5 issue from the housing 4 and carry driving wheels 6 or sprockets meshing with the two tracks of the vehicle for driving the same.

A steering shaft 7 also issues from the housing of the assembly 4, said steering shaft adapted to be rotated by any suitable means in forward and reverse directions. In the example shown, the steering shaft is connected to the output of a two-way hydraulic motor 8 operated by a hydraulic pump 9 with the intermediary of a two-way and neutral control valve 10, the hydraulic return lines of the pump and motor being connected to a hydraulic reservoir 11.

Obviously, the steering shaft could be rotated in both directions by other means, such as manual means, electric motor means, air motor means and the like.

Referring to FIG. 1, it is seen that the power-driven shaft 3 is provided with a bevelled pinion 12 adapted to mesh alternately with bevelled gears 13, 13', splined but axially slidable on an intermediate shaft 14 mounted between and axially aligned with both output shafts 5. A fork 29 engages collars 30 of gears 13, 13' and serves to move the gears according to double arrow 31 to rotate shaft 14 in forward or reverse direction. Fork 29 may have a right angle control arm 32 extending through casing 4 and pivoted thereto at 33 (FIG. 2). A suitable conventional mechanism (not shown) acts on arm 32 to hold one or the other of gears 13, 13' in meshing engagement with pinion 12 until arm 32 is displaced under the action of the operator. Intermediate shaft 14, together with output shafts 5, are therefore preferably arranged at right angles to the power-driven shaft 3.

The inner end of each output shaft 5 carries a planetary gearing. Each planetary gearing in the example shown consists of a support 15 which may consist of a flanged hub splined on the output shaft 5 and carrying, for instance, four planetary gears 16 co-axial with the output shaft 5 and each mounted on a stud shaft 17 protruding from support 15. A ring 18 is secured to stud shafts 17 to retain gears 16 thereon.

The planetary gears 16 are driven by the intermediate shaft 14 through crown gears 19 keyed to the respective ends of shaft 14 and having radially inwardly directed teeth 20 meshing with the planetary gears 16 and surrounding all of said gears. Gears 16 and 19 at both ends of shaft 14 form two planetary gear means operatively interconnecting power driven shaft 14 to output shafts 5 respectively.

A reaction gearing is provided for each planetary gear assembly. Each reaction gearing includes a sun gear 21 meshing with planetary gears 16 and formed at the end of a sleeve 22 freely surrounding the associated output shaft 5 with the intermediary of a bushing 23.

A drum 24 is secured to the respective sleeves 22, surrounds and encloses the planetary gears 16 and crown gear 19. The end of the cylindrical portion of the drum is directed towards the steering shaft 7 and is provided with bevelled gear teeth 25 meshing with a bevelled gear 26 keyed to the inner end of the steering shaft 7. The two drums 24 mesh with gear 26 at diametrically opposed zones of the latter.

All of the shafts are suitably mounted in bearings 28, in turn supported by a housing, schematically shown at 4 in FIG. 2, surrounding the above-described elements and from which issue the four shafts.

The system of the invention operates as follows:

Supposing the steering shaft 7 is stationary, the two drums 24 and, therefore, the two sun gears 21 are also stationary and the input shaft 3 drives the intermediate shaft 14, which in turn drives the crown gears 19 in the same direction of rotation; the latter in turn drive the planetary gears 16, which, because they are meshing with the stationary sun gears, cause rotation of the discs 15 and therefore of the output shafts 5 secured thereto in the same direction of rotation and at equal speeds.

The speed of the output shafts is half the rotational speed of the intermediate shaft 14, due to the planetary gear systems. The gear ratio of the bevelled pinion 12 and bevelled gear 13 or 13' may be varied, so as to obtain the desired speed ratio between the input shaft 3 and the output shafts 5.

To effect steering movement of the vehicle, steering shaft 7 is rotated, therefore causing rotation of the respective sun gears 21 in opposite directions, thus causing decelerating of one output shaft and accelerating of the other output shaft. The speed differential between the two output shafts may be progressively increased or decreased by varying the speed of rotation of the steering shaft.

The steering shaft is rotatable in two opposite directions to obtain steering of the vehicle in any direction. The shiftable gears 13, 13' provide a convenient, simple means for reversing the drive in combination with the steering system. Obviously, if no reverse is desired, gears 13, 13' are replaced by a single bevelled gear in constant mesh with pinion 12.

Depending on the type of material used for the gears, casing 4 will be filled with a lubricating agent or left dry.

It is obvious that any means for rotating the steering shaft can be provided in accordance with the invention.

It is also obvious that the gears can be replaced by friction wheels in lower power applications; therefore, the terms "gear means," "gear" and "gearing" used in the claims, are meant to include friction wheels.

What I claim is:

1. A mechanical driving and steering system for tracked vehicles having at least two tracks, comprising a power-driven shaft, output shafts for driving the respective tracks, a steering shaft, two planetary gear means operatively interconnecting said power-driven shaft and said output shafts respectively, and two reaction gearings, one for each planetary gear means, operatively connected to said steering shaft for movement in opposite directions.

2. A mechanical driving and steering system as claimed in claim 1, wherein each planetary gear means include a support secured to the respective output shafts, planetary gears carried by said support, and a crown gear having radially inwardly directed teeth meshing with said planetary gears, the two crown gears being operatively connected to said power-driven shaft for movement in the same direction, said reaction gearings each including a sun gear meshing with said planetary gears.

3. A mechanical driving and steering system as claimed in claim 1, wherein the operative connections of said reaction gearings to said steering shaft include two toothed drums, one for each reaction gearing, arranged on opposite sides of said steeing shaft, and a gear secured to said steering shaft and meshing with both toothed drums.

4. A mechanical driving and steering system as claimed in claim 1, wherein each planetary gear means include a support secured to the respective output shafts, planetary gears carried by said support, and a crown gear having radially inwardly directed teeth meshing with said planetary gears, both crown gears operatively connected to said power-driven shaft for movement in the same direction, said reaction gearings each including a sun gear meshing with the respective planetary gears and the operative connections of said sun gears to said steering shaft include two toothed drums arranged on opposite sides of said steering shaft and rigid with the respective sun gears, and a gear secured to said steering shaft and meshing with said toothed drums.

5. A mechanical driving and steering system as claimed in claim 1, wherein said output shafts are axially aligned and spaced from each other, said power-driven shaft and said steering shaft are perpendicular to said output shafts, the connection of said planetary gear means to said power-driven shaft including an intermediate shaft disposed intermediate and axially aligned with said output shafts, a bevelled gear keyed on said intermediate shaft, and a pinion keyed on said power-driven shaft and meshing with said bevelled gear.

6. A mechanical driving and steering system as claimed in claim 5, wherein each reaction gearing consists of a sun gear mounted co-axially of, said surrounding, the associated output shaft, and the operative connection of said reaction gearing to said steering shaft including a drum secured to said sun gear surrounding said output shaft and said planetary gear means and having bevelled teeth, and a bevelled gear secured to said steering shaft and having diametrically opposed zones meshing with the bevelled teeth of the respective drums.

7. A mechanical driving and steering system as claimed in claim 6, wherein the respective planetary gear means include a support secured to the respective output shafts, planetary gears carried by said support, a crown gear secured to the respective ends of said intermediate shaft and having radially inwardly directed teeth meshing with the respective planetary gears and surrounding the same.

8. A mechanical driving and steering system as claimed in claim 1, wherein said outlet shafts are axially aligned and spaced from each other, said power-driven shaft and said steering shaft are perpendicular to said output shafts, the connection of said planetary gear means to said power-driven shaft including an intermediate shafts disposed intermediate and axially aligned with said output shafts, first and second bevelled gears keyed and shiftable on said intermediate shaft, a pinion keyed on said power-driven shaft between said bevelled gears and meshing alternately with said first and second bevelled gears, and control means to shift said bevelled gears to reverse the direction of rotation of said intermediate shaft.

9. A mechanical driving and steering system as claimed in claim 8, wherein each reaction gearing consists of a sun gear mounted co-axially of, and surrounding, the associated output shaft, and the operative connection of said reaction gearing to said steering shaft including a drum secured to said sun gear surrounding said output shaft and said planetary gear means and having bevelled teeth, and a bevelled gear secured to said steering shaft and having diametrically opposed zones meshing with the bevelled teeth of the respective drums.

10. A mechanical driving and steering system as claimed in claim 9, wherein the respective planetary gear means include a support secured to the respective output shafts, planetary gears carried by said support, a crown gear secured to the respective ends of said intermediate shaft and having radially inwardly directed teeth meshing with the respective planetary gears and surrounding the same.

References Cited
UNITED STATES PATENTS

| | | | |
|---|---|---|---|
| 1,393,409 | 10/1921 | Thompson | 74—695 X |
| 1,872,541 | 8/1932 | White | 74—695 |
| 2,314,664 | 3/1943 | Shenstone | 74—695 |
| 2,352,483 | 6/1944 | Jandasek | 180—6.44 |
| 3,321,734 | 3/1968 | Zaunberger et al. | 74—720.5 X |
| 3,461,744 | 8/1969 | Booth | 74—720.5 |

ARTHUR T. McKEON, Primary Examiner

U.S. Cl. X.R.

74—695, 720.5